United States Patent [19]
Kubo

[11] Patent Number: 5,189,585
[45] Date of Patent: Feb. 23, 1993

[54] FLOPPY DISK WITH HEAD SLOT IN LINER CUT FROM LINER MATERIAL WITH PREFERRED ORIENTATION

[75] Inventor: Toyohide Kubo, Tokushima, Japan
[73] Assignee: AWA Engineering Co., Ltd., Tokushima, Japan
[21] Appl. No.: 544,217
[22] Filed: Jun. 18, 1990

Related U.S. Application Data

[63] Continuation-in-part of Ser. No. 318,713, Mar. 3, 1989, abandoned.

[30] Foreign Application Priority Data

Mar. 8, 1988 [JP] Japan .................................. 63-55348

[51] Int. Cl.⁵ ..................... G11B 23/033; B65D 85/30
[52] U.S. Cl. .................................... 360/133; 360/135; 206/444; 428/900
[58] Field of Search .................. 360/133, 128, 132; 206/444, 312, 313; 428/900; 369/291, 272; 156/227, 252

[56] References Cited

U.S. PATENT DOCUMENTS

| | | | |
|---|---|---|---|
| 4,263,634 | 4/1981 | Chenoworth et al. | 360/133 X |
| 4,470,083 | 9/1984 | Doering et al. | 360/128 |
| 4,655,348 | 4/1987 | Takagi | 206/444 X |
| 4,680,661 | 7/1987 | Oishi | 360/128 |
| 4,803,584 | 2/1989 | Doi et al. | 306/444 |
| 4,814,927 | 3/1989 | Iwamoto et al. | 360/133 |
| 4,839,765 | 6/1989 | Lam | 360/133 |
| 4,845,583 | 7/1989 | Zimmerman et al. | 360/133 X |
| 4,946,530 | 8/1990 | Lam | 360/133 |

FOREIGN PATENT DOCUMENTS

| | | | |
|---|---|---|---|
| 62-184675 | 8/1987 | Japan | 360/133 |
| 63-152074 | 6/1988 | Japan | 360/133 |

Primary Examiner—Stuart S. Levy
Assistant Examiner—Alfonso Garcia
Attorney, Agent, or Firm—Wenderoth, Lind & Ponack

[57] ABSTRACT

A 3.5 inch floppy disk is provided with a nonwoven microfiber positioned between the thin magnetic disk and the rigid shell. The liner is fixed to the inside surface of the shell, and has a disk head slot cut out corresponding to the location of the disk head opening in the shell. A specified fiber orientation in the liner's nonwoven material provides it with more tensile strength in a longitudinal direction than in a lateral direction. Cutting the disk head slot in the lateral direction reduces the fiber protrusion and loose cuttings at the edges, and thereby reduces bit errors.

1 Claim, 4 Drawing Sheets

CONVENTIONAL
LINER MATERIAL

CONVENTIONAL
LINER MATERIAL

FLOPPY DISK WITH HEAD SLOT IN LINER CUT FROM LINER MATERIAL WITH PREFERRED ORIENTATION

This application is a continuation-in-part application of Ser. No. 07/318,713, filed Mar. 3, 1989, now abandoned.

BACKGROUND OF THE INVENTION

This invention relates to a floppy disk with a rigid outer shell that encases a magnetic disk, and more particularly to a floppy disk in which the magnetic disk rotates in contact with a liner made of nonwoven material attached to the inner surfaces of the shell.

A floppy disk is constructed by sandwiching a magnetic disk between two shell halves, the inner surfaces of which have precut nonwoven material liners attached to them. The liner is in contact with, and protects the magnetic disk which rotates inside the shell. To protect the surfaces of the magnetic disk from scratches, as well as to remove foreign particulates on the magnetic disk's surfaces, a liner made of nonwoven material made of extremely fine fibers is used. These nonwoven microfiber materials, which are known and commonly available, are flexible, and can protect the surface of the magnetic disk without scratching it. The nonwoven material is a volumetric collection of randomly oriented fibers which are bonded at fiber crossing points and fabricated into sheets. However, when this nonwoven material is cut into a specified shape, microscopic fibers protrude from the cut edge. After the shell halves have been sealed together and the floppy disk is complete, microfibers protruding from the liner, especially at the lead slot in the liner, become separated by disk rotation, become lodged between the magnetic disk and the read write head, and thereby cause bit errors.

Automated equipment has become particularly prominent in recent years. Various automated cutters are configured to cut such nonwoven material by scissoring between male and female pieces. However, the cutting interval of the male and female pieces of these cutters is wider than the microfibers of the nonwoven material. When cutter sharpness is reduced, fibers are not reliably cut, and this readily causes fibers to protrude from the cut edge. Such nonwoven materials in which the fibers are made from synthetic resins such as rayon, polypropylene, polyester, nylon, or acrylic are conventionally used for the liners. Since the extremely fine fibers of these nonwoven materials are on the order of 10 to 20 microns thick, the cutting interval of the male and female pieces must be made smaller than that. Consequently, very high precision machinery is required for a cutter that can reliably sever microfibers along the cutting edge. Further, since cutter use is accompanied by wear and reduction in sharpness, cutting the liner from such nonwoven material with a consistently good cutting device is very difficult. For this reason, it is extremely difficult to cut reliably and consistently, and to prevent fiber protrusion from the cut edge of the liner.

Further, regardless of how well the cutter operates, when short fiber pieces are cut loose along the cut edge, there is no way to prevent these cuttings from separating from the liner during use after fabrication. In other words, since such nonwoven material is a collection of randomly oriented fibers and the fibers are bent and joined at common crossing points, even for a straight cut, a single fiber can be cut in two places between crossing points with other fibers. Such a fiber has both ends severed from crossing points bonded with other fibers, and it becomes a loose fiber cutting which is not connected to the liner. This fiber cutting may become separated from the liner after disk fabrication, and will usually get caught between the magnetic disk and the read write head, and causes bit errors as a result.

More particularly, since both cut edges of the liner's disk head slot are perpendicular to the direction of magnetic disk rotation, cut fibers at these edges which are not securely connected with the liner are especially likely to become separated, stick to the surface of the magnetic disk, and be carried inside the shell. Fiber cuttings carried inside the shell ultimately end up between the magnetic disk and the read write head to cause bit errors. To avoid this cause of bit errors, the amount of fiber separation occurring at both cut edges of the disk head slot should be drastically reduced.

As shown in FIG. 5, one way to reduce fiber separation is to bond the edge of the disk head slot 5 in the liner 3 to the shell 2, so that fiber separation will not occur at that edge. However, in order to reliably bond the edge of the disk head slot 5 to the shell 3, the liner 3 must be accurately aligned with the shell 2. Any misalignment between the liner 3 and the shell 2 makes it impossible to attach the edge of the disk head slot to the shell. In the actual fabrication process, it is extremely difficult to accurately align the flexible, easily distorted liner with the shell.

The present invention was developed to overcome the problems described above. It is thus the primary object of the present invention to provide a floppy disk that simply and easily reduces fiber separation from the liner, and decreases bit error caused by the separation of microfiber cuttings from the liner.

SUMMARY OF THE INVENTION

In order to reduce bit errors in the floppy disk of the present invention, the liner is cut from the conventional nonwoven material for the liner in a specified fashion.

The floppy disk of the present invention comprises a thin circular magnetic disk, a rigid shell which encases the magnetic disk in a manner that allows it to rotate freely, and a liner. The liner is positioned between the shell and the magnetic disk. Further, the liner is made of conventional nonwoven material, has a center hole, and is fixed to the inner surface of each shell half. The shell center hole aligns with the liner center hole, and the shell is further provided with a disk head opening. The liner has a disk head slot cut out positioned corresponding to the disk head opening in the shell.

In the conventional nonwoven material for which the liner is cut, the tensile strength in a longitudinal direction is greater than the tensile strength in a lateral direction because of the fiber orientation. The liner is cut out of the liner material so that the disk head slot extends in a direction which corresponds to the lateral direction of the nonwoven material.

DESCRIPTION OF THE PREFERRED EMBODIMENT

The preferred embodiment of the present invention is described based on illustrations as follows. However, the floppy disk described in this embodiment is intended only as a specific example of the technology involved in this invention, which is in no way restricted to the following embodiment. It is therefore to be understood that, within the scope of the appended claims, the invention may be practiced other than specifically described.

Figure 3:
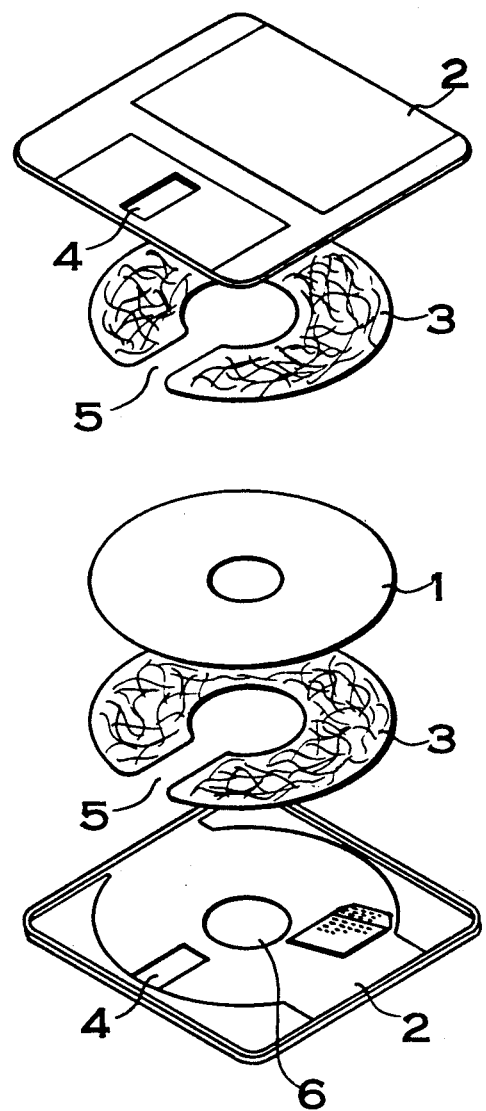
FIG. 3 is an exploded perspective view showing the floppy disk of the present invention.
Figure 4:
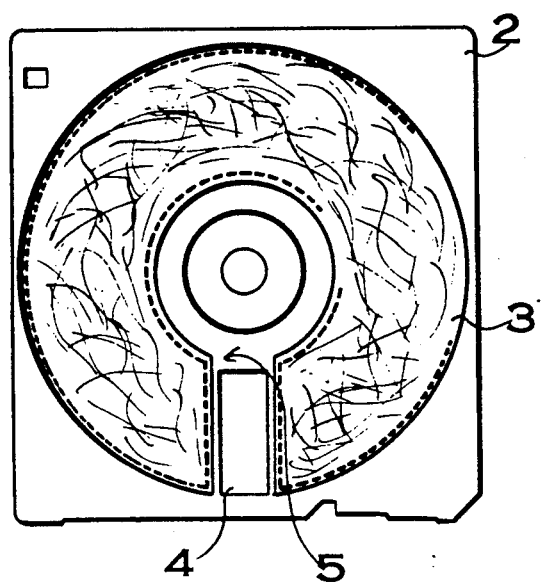
FIG. 4 is a plan view of one half of the shell of the floppy disk with the liner attached.
Figure 5:
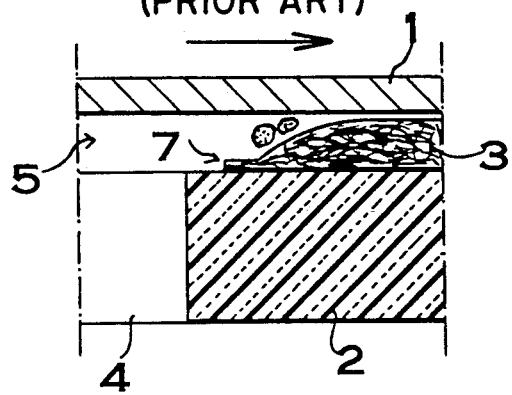
FIG. 5 is an enlarged fragmentary cross-sectional view showing the attachment of the liner to the shell.

As shown in FIGS. 3 and 4, the 3.5 inch floppy disk comprises a thin circular magnetic disk 1, a rigid shell 2 which encloses the magnetic disk 1 in a manner that allows it to rotate freely, and liners 3 positioned between the shell 2 and the magnetic disk 1.

The shell 2 is formed from hard synthetic resin. Two shell halves are sealed together enclosing two liners 3 and one magnetic disk 1. A disk head opening 4 is provided through the shell 2 to allow entry and exit of a disk head for reading and writing signals on the magnetic disk 1 during use. Although it is not illustrated, a disk head opening shutter is provided which opens the disk head opening 4 during use and closes it during nonuse.

As shown in FIG. 3, a center hole 6 is cut through the bottom half of the shell 2 to allow the magnetic disk 1 to be driven.

The liner 3 is attached to the inner surface of the shell 2 to prevent the magnetic disk 1 from coming in direct contact with the surface of the shell 2. The liner 3 also captures foreign objects introduced through the disk head opening 4, thereby preventing bit errors caused by foreign particles. In other words, the liner 3, positioned between the magnetic disk 1 and the shell 2, protects the surface of the magnetic disk 1.

Nonwoven microfiber materials like that heretofore used for liners is used for the liner 3, but, as will be described hereinafter, the liner is cut from the liner material in a certain way. The liner 3 is cut in a circular shape and an elongated disk head slot 5 provided where the disk head opening 4 is cut through the shell 2. As shown by the dash lines in FIG. 4, the liner 3 is attached to the inner surface of the shell 2 along part of its inner and outer perimeters as well as on both sides of the disk head slot 5. The circular shape of the liner 3 is cut such that its outer perimeter aligns with the outer edge of the disk head opening 4, and its inner perimeter is closer to the center than the inner edge of the disk head opening 4.

Figure 6:
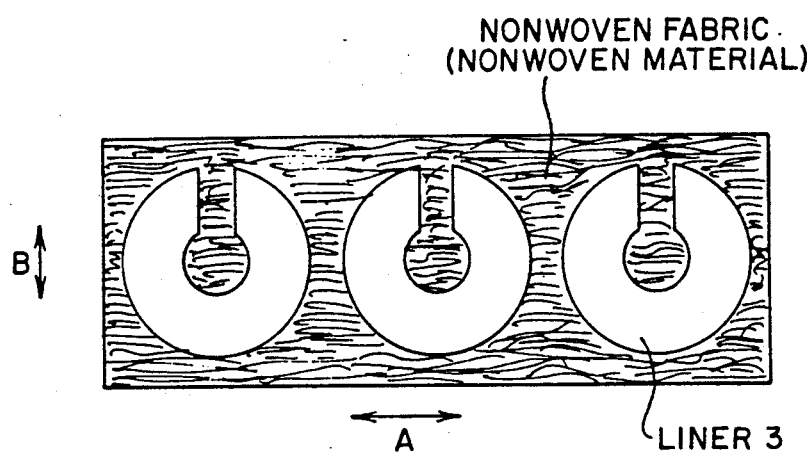
FIG. 6 is a schematic plan view of liners being cut from a liner material according to the invention.

Referring to FIG. 6, the fiber orientation of conventional nonwoven liner material is such that tensile strength is greater in one direction A, which will be called a longitudinal direction, than in a second direction B transverse to the first direction, which second direction will be called a lateral direction, and according to the present invention the disk is cut from the liner material such that the head slot 5 has the edges thereof which extend in the direction of elongation of the slot in the lateral direction. It has been found that the conventional nonwoven material that makes up the liner 3 is not a volumetric collection of completely randomly oriented fibers that connect at the fiber crossing points. Rather, while there is a certain randomness, more fibers extend in one direction A (the longitudinal direction) than in a second or perpendicular direction B (the lateral direction) resulting in greater longitudinal tensile strength than lateral tensile strength. When a force is applied to the nonwoven material in the longitudinal direction, it tends to stretch the fibers. When a force is applied in the lateral direction, it tends to pull the fibers away from each other transversely of the length of the fibers. This nonwoven fiber material is more resilient to tension that pulls the fibers in the longitudinal direction than to tension that pulls the fibers away from each other laterally. Specifically, when the conventional nonwoven material is pulled in the direction in which more fibers extend, fibers are pulled longitudinally, and can withstand tension. However, when the material is pulled in a direction perpendicular to the direction in which more fibers extend, fibers are pulled away from each other laterally, and only a lower tensile strength is achieved. In other words, the direction with highest tensile strength is the direction with more fibers aligned longitudinally, and the direction with the lowest tensile strength is that perpendicular to the direction in which more fibers are aligned.

In this invention, the liner 3 is cut from the liner material so that the disk head slot 5 in the nonwoven fiber liner 3 has the direction of slot elongation in direction B, as shown in FIG. 6, perpendicular to the direction A having more longitudinally aligned fibers. Namely, the disk head slot 5 extends in the lateral direction B of the liner material. The longitudinal and lateral directions of the nonwoven fiber are determined by the application of mutually perpendicular tension forces to the liner material and a determination of which direction shows the greater tensile strength. The direction with higher tensile strength is the longitudinal direction, and the direction with lower tensile strength is the lateral direction.

However, for purposes of this patent description, the longitudinal direction of the nonwoven material is not limited to that direction with the greatest tensile strength, and the lateral direction is not limited to that direction with the least tensile strength. Rather, when the nonwoven material has tension applied in two mutually perpendicular directions and a difference in tensile strength is observed, the stronger direction is called longitudinal, and the weaker direction is called lateral. Consequently, for purposes of this patent description, the longitudinal direction means the direction of maximum tensile strength ±45°, and the lateral direction means the direction perpendicular to that.

In general, conventional nonwoven fiber is a volumetric collection of more or less ramdonly oriented fibers held together at common crossing points with a binder. The conventional liner material for the floppy disk of this invention is made of such nonwoven material, and as pointed out above, such material is formed from fibers which actually have a greater proportion oriented such that the tensile strength in a longitudinal direction is greater than the tensile strength transversely thereof, i.e. in a lateral direction. Longitudinal and lateral strength of nonwoven material can of course be adjusted by deliberate arrangement of the fiber matrix to make such an adjustment. For example, if the fibers in a sheet of nonwoven material have absolutely no preferred orientation (as viewed from above the sheet), then the material's longitudinal and lateral tensile strengths will be equal. When the number of fibers aligned in a longitudinal direction becomes greater than those in a lateral direction, the tensile strength in the longitudinal direction becomes greater than in the lateral direction. Further, the differences between the tensile strengths in the longitudinal and lateral directions increases with the percentage of fibers that are aligned in the longitudinal direction. Liner material with such deliberately arranged fiber orientation is not excluded from the scope of this invention.

As pointed out above, the disk head slot 5 is cut through the liner 3 so that the elongated direction is in the lateral direction of the nonwoven material. In this direction, the disk head slot 5 cuts across the fibers aligned in the longitudinal direction. For this reason, the probability of producing separated fiber clippings or loose ends prone to stretching from the cut edge is reduced (as compared with completely randomly oriented fiber material or the cut edges extending in other directions).

This situation is described with reference to conceptual illustrations FIGS. 1 and 2 in the following.

Figure 1:
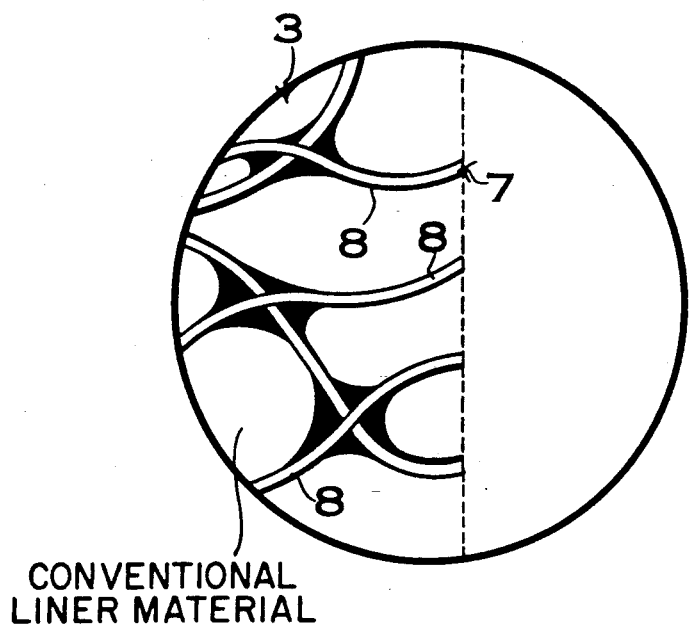
FIGS. 1 and 2 are enlarged cross-sectional views showing cut edges of nonwoven fiber material.

As shown in FIG. 1, when the edge 7 of the disk head slot cuts across the fibers 8, that is when the direction of elongation of the disk head slot 5 extends in the lateral direction of the nonwoven material, few fiber clippings are separated from the bulk of the liner 3, and even if the ends of the cut fiber 8 are pulled, they will not be stretched far from the cut edge 7.

Figure 2:
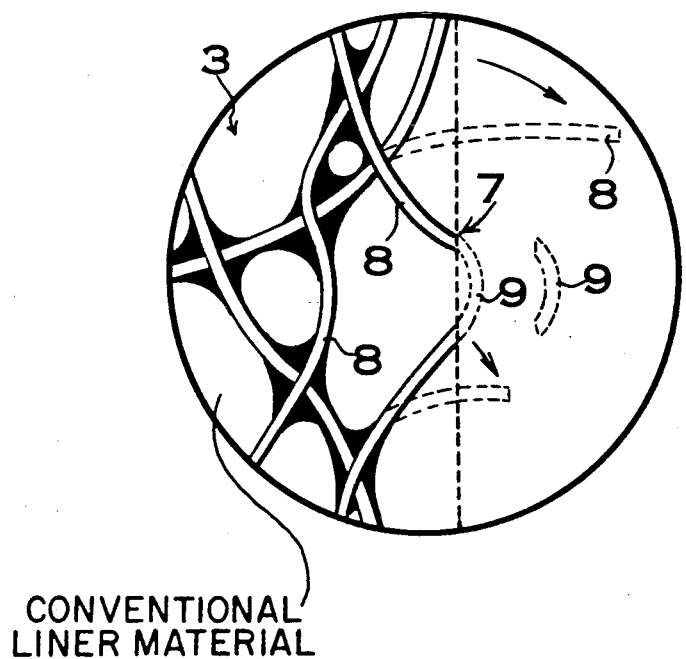

On the other hand, as shown in FIG. 2, when the cut edge 7 of the disk head slot 5 extends in the longitudinal, or lengthwise direction of the fibers 8, the center portions of fibers 8 are cut out, producing clippings 9 which are freed from the fibers of the liner 3. Further, cut fibers 8 stretch and project out from the cut edge 7. During cutting, numerous microfiber clippings 9 are produced but remain in the liner during the fabrication process. These clippings end up inside the shell, and are transported to the disk head by the rotating magnetic disk, and become the cause of bit errors.

In actuality, all of the fibers 8 do not line up together in one direction of the conventional nonwoven material as shown in FIGS. 1 and 2. However, in such nonwoven material with different lateral and longitudinal tensile strengths, which are attributable to fiber orientation, the amount of fibers 8 lined up in the longitudinal direction is greater than the amount of fibers 8 lined up in the lateral direction. Consequently, a disk head slot cut so that the direction of elongation in the lateral direction of the nonwoven material has many of its fibers cut as depicted in FIG. 1, and a disk head slot cut so that the direction o elongation in the longitudinal direction of the nonwoven material has many of its fibers cut as depicted in FIG. 2.

When the liner used in the floppy disk is cut from the conventional liner material with the direction of elongation of the head slot according to the present invention, this invention has many of its fibers cut in the fashion depicted in FIG. 1. At the cut edge of the disk head slot very few fiber clippings are freed from the bulk of the liner, and the number of loose ends prone to stretching out from the cut edge are reduced (as compared with material and completely randomly oriented fibers or when the direction of the elongation of the slot is in other directions). This effectively reduces bit errors, which is a very important feature for floppy disks, and particularly for modern high density memory disks.

As described above, simply by cutting the slot in a particular cutting direction through the nonwoven material, floppy disk bit errors can be reduced. This unpretentious technology features easy, simple, and inexpensive mass production capability.

EXAMPLE

A sheet of conventional floppy disk nonwoven fibrous liner material sold under the trade name Nippon Bailin type FD-3520 by Nippon Bailin K.K. of Chiyoda-ku, Tokyo, Japan, had tensile force applied thereto to determine a direction A as shown in FIG. 6 in which the material had a greater tensile strength than in direction B perpendicular thereto. Floppy disk liners 3 were cut from the sheet of material with the direction of elongation of the radial disk head slot therein in the direction B, i.e. perpendicular to the direction A of greater tensile strength.

Figure 8:
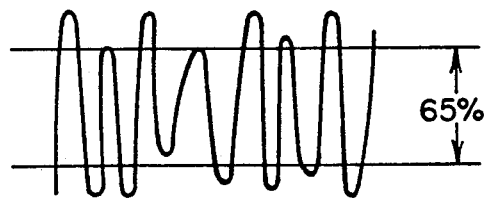
FIG. 8 is a diagram of a read out signal from a floppy disk.

One of the liners was incorporated in a floppy disk, and a constant level AC signal was written onto the floppy disk, and was then read out and the the read out level measured. Any part of the signal with a measured level less than or equal to 65% of the amplitude of the original AC amplitude was considered a read or write failure (see FIG. 8).

Figure 7:
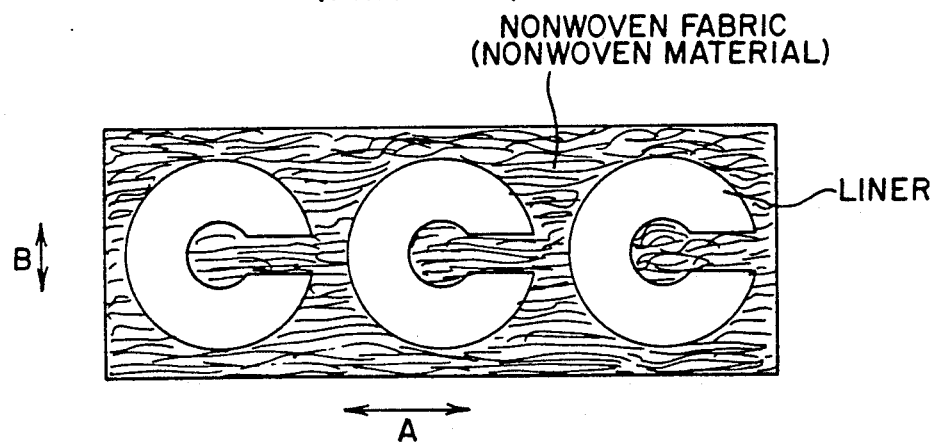
FIG. 7 is a view similar to FIG. 6 of liners cut from the liner material for comparison with the lining of FIG. 6.

For comparison, identical disk liners were cut from identical material but with the disk head slots parallel to the direction A, as shown in FIG. 7, and one was placed in an identical floppy disk and the constant level AC signal written thereonto and then read out. The read out level was measured as before and the results compared.

It was found that while the read-write failure rate for the floppy disk with the liner cut from the liner material as shown in FIG. 7 was about 5%, the read write failure rate for the floppy disk with the liner cut from the liner material as shown in FIG. 6 was from 1 to 2%.

What is claimed is:
1. A method of making a floppy disk comprising:
determining a direction in which a sheet of liner material for producing an annular floppy disk liner having an elongated radial disk head slot therein has a tensile strength which is greater than a tensile strength in a direction perpendicular to said first-mentioned direction;
cutting from the sheet of liner material such a floppy disk liner with a direction of elongation of the disk head slot being in said direction perpendicular to said firstmentioned direction;and
assembling the thus cut out floppy disk liner in a floppy disk between a magnetic disk and a rigid casing for containing the magnetic disk with the disk head slot in the liner aligned with a corresponding disk head slot in the casing.

* * * * *